Oct. 25, 1955 — D. O. BAIRD — 2,721,926
ELECTRIC HEATING SYSTEMS FOR OVENS OR THE LIKE
Filed Nov. 14, 1952 — 2 Sheets-Sheet 1

FIG. 1

INVENTOR.
Douglas O. Baird
BY
Smith, Olsen & Baird
Attys.

Oct. 25, 1955     D. O. BAIRD     2,721,926
ELECTRIC HEATING SYSTEMS FOR OVENS OR THE LIKE
Filed Nov. 14, 1952     2 Sheets-Sheet 2

INVENTOR.
Douglas O. Baird
BY
Smith, Olsen + Baird
Attys.

United States Patent Office 2,721,926
Patented Oct. 25, 1955

2,721,926

ELECTRIC HEATING SYSTEMS FOR OVENS OR THE LIKE

Douglas O. Baird, Skokie, Ill., assignor to General Electric Company, a corporation of New York Application November 14, 1952, Serial No. 320,402

11 Claims. (Cl. 219—20)

The present invention relates to electric heating systems for ovens, or the like, and more particularly to combination manually-controlled and clock-controlled switching mechanisms for such ovens.

An electric range ordinarily comprises an oven provided with clock mechanism for selectively closing and opening the heating circuit thereof respectively at set start and stop clock times so that an automatic cooking operation may be carried out in the oven under the control of the clock mechanism after setting thereof. This clock mechanism conventionally comprises a manually operable master control lever that is selectively operable into "on," "off" and "manual" positions, as well as at least one manually operable knob for selectively setting the start clock time and the stop clock time. Further, the heating circuit normally comprises a manually operable selector switch having "broil," "off," "manual bake" and "time bake" positions, as well as a manually settable oven temperature regulator. Now all of these devices must be properly controlled and set in order to condition the heating circuit for an automatic cooking operation in the oven; and further, the operator must remember to disable the clock mechanism after an automatic cooking operation in order to restore the heating circuit to manual control. Specifically, after an automatic cooking operation, the operator must operate the master control lever of the clock mechanism from its "off" position back into its "manual" position in order that the selector switch in its "manual bake" position may govern the heating circuit on a manual basis, since the clock mechanism incorporates switching contacts that are arranged in series circuit relationship with the manually operable selector switch. Needless to say, all of this manipulation of the knobs and levers in order to shift between manual control and automatic control of the cooking operations in the oven of the electric range is confusing to an operator and leads to many unnecessary service calls.

Accordingly, it is a general object of the present invention to provide an electric heating system for an oven, or the like, that incorporates a minimum number of manually operable devices and that accommodates both manual control and automatic control of the various cooking operations which may be carried out in the oven.

Another object of the invention is to provide in combination manually-controlled and clock-controlled switching apparatus, a manually operable member selectively operative into a plurality of control positions positively to operate the associated switching mechanism into its respective and corresponding control positions, regardless of the set or unset position of the associated clock mechanism, whereby the control position of the member overrides the control position of the clock mechanism with respect to the actual control of the switching mechanism.

Another object of the invention is to provide in combination manually-controlled and clock-controlled switching apparatus, an improved and simple arrangement governed by initial manual control of the switching mechanism for placing subsequent automatic control thereof under the clock mechanism.

A further object of the invention is to provide in a combination manually-controlled and clock-controlled heating circuit for an oven, a control arrangement that consists of only two manually operable control knobs or devices, one of the control knobs being employed for the combined purposes of initially operating the control switch and of selectively setting the temperature that is to be held in the oven, and the other of the control knobs being employed for the combined purposes of setting the start clock time and the stop clock time between which clock times the oven is to be heated.

A further object of the invention is to provide a heating control system of the type noted that is automatically restored into its normal manually-controlled position at the conclusion of its clock-controlled operation.

A still further object of the invention is to provide a heating control system for an oven, that includes a combined manually-operated and motor-operated control switch provided with off and bake and broil positions that are so interlocked that improper control of the corresponding heating circuits is impossible, regardless of the sequence of the control operations that are performed by the operator.

Further features of the invention pertain to the particular arrangement of the elements of the electric heating system, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
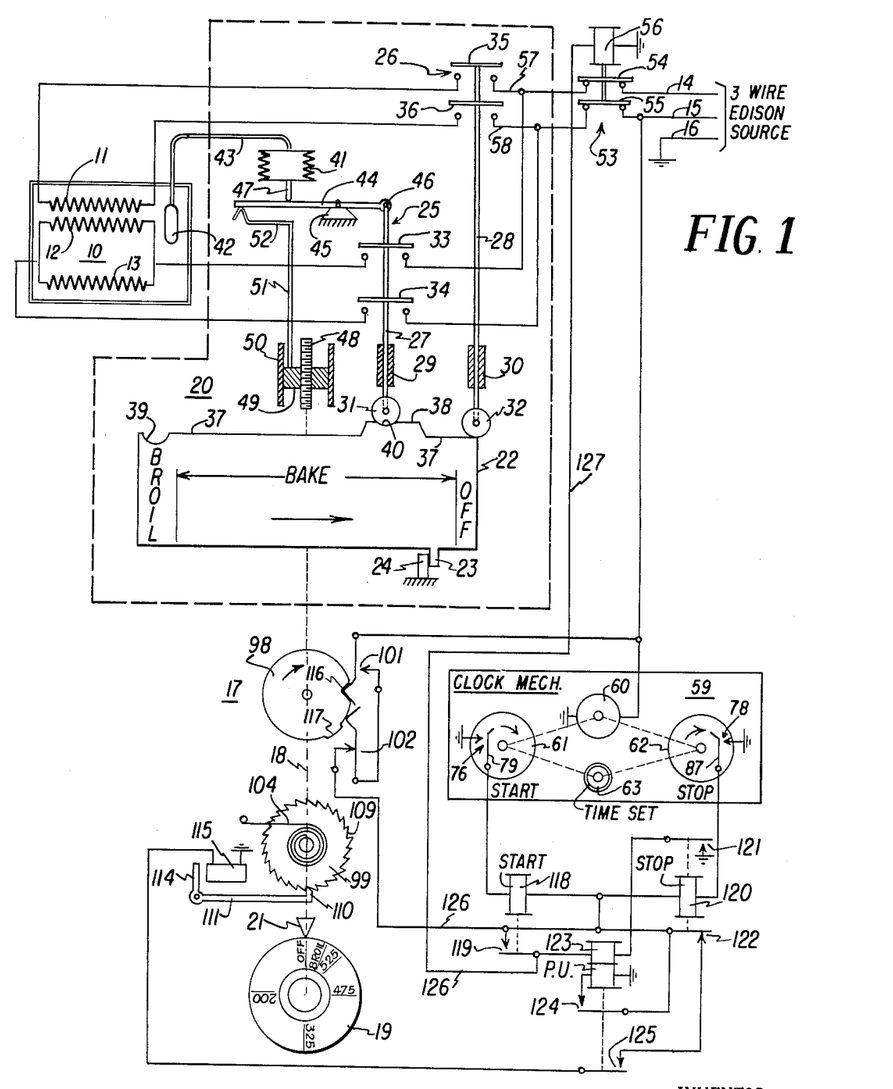
Figure 1 is a combined electrical and mechanical diagram of an electric heating system for an oven, or the like, and embodying the present invention.

Referring now to Fig. 1 of the drawings, the electric heating system there illustrated and embodying the features of the present invention comprises an oven 10 provided with an upper broil heating unit 11, respective upper and lower bake heating units 12 and 13, and a source of power supply of the three-wire Edison type of 230-volts, single phase, A. C., and including two ungrounded outside line conductors 14 and 15, and a grounded neutral line conductor 16. Also, the heating system includes a control switch 17 comprising a rotatably mounted operating shaft 18 carrying a manually operable control dial or knob 19 on the outer end thereof and switching mechanism 20 on the inner end thereof, the switching mechanism 20 being indicated within the broken boundary lines. Specifically, the control dial 19 is rigidly secured to the outer end of the operating shaft 18 and is provided with extreme off and broil positions and an intermediate variable bake position and carries on the face thereof corresponding indices cooperating with an associated index marker 21. More particularly, the variable bake position of the control dial 19 is calibrated in terms of temperatures in degrees F. that correspond to desired temperatures in degrees F. that may be held in the oven 10.

The mechanism 20 includes an annular sleeve 22 that is rigidly secured to the operating shaft 18, the annular sleeve 22 being illustrated in a flat developed condition in Fig. 1, for purpose of illustration, so that all 360° thereof are shown; whereby the annular sleeve 22 comprises extreme off and broil positions and an intermediate variable bake position respectively corresponding to the positions of the control dial 19. The annular sleeve 22 carries a projection or stub 23 that cooperates with an exteriorly supported projection or stop 24 in order positively to fix the extreme off and broil positions thereof and to accommodate rotation of the sleeve 22 through an angle of approximately 350°. Also, the switching mechanism 20 includes a bake switch 25 and a broil switch 26 respectively provided with operating stems 27 and 28 slidably mounted in respective external supports 29 and 30. Also, the operating stems 27 and 28 respectively carry on the inner ends thereof rollers 31 and 32 that cooperate with the sleeve 22 in a manner more fully explained hereinafter. Two contact bridging members 33 and 34 are carried by the outer end of the operating stem 27; and two contact bridging members 35 and 36 are carried by the outer end of the operating stem 28. More particularly, the edge of the sleeve 22 adjacent to the rollers 31 and 32 is provided with an operating cam cooperating therewith that includes a reference surface 37, a projection 38 and a depression 39. Further a slight depression 40 is provided in the face of the projection 38 that cooperates with the roller 31 for the purpose of positively establishing the off position of the sleeve 22, as explained more fully hereinafter.

Also, the switching mechanism 20 comprises a thermal operating bellows 41 that is operatively connected to a thermal bulb 42 arranged in the oven 10 by a capillary tube 43, the elements 41, 42 and 43 confining a suitable expansible fluid in the usual manner. A lever 44 is pivotally mounted intermediate the ends thereof upon an exterior support 45, the right-hand end of the lever 44 being pivotally connected to the extreme outer end of the operating stem 27 as indicated at 46, and the left-hand end of the lever 44 cooperating with an operating part 47 carried by the bellows 41. Further, the extreme inner end of the operating shaft 18 is threaded as indicated at 48 and carries a traveling nut 49 that is supported by external structure 50 for movement longitudinally of the operating shaft 18. Also, an element 51 is carried by the traveling nut 49 and in turn, carries a resilient spring 52 arranged in engagement with the left-hand end of the lever 44. When the control dial 19 occupies its off position, illustrated in Fig. 1, the sleeve 22 occupies its off position, whereby the roller 31 engages the slight depression 40 provided in the face of the projection 38 and moves the operating stem 27 positively to open the bake switch 25. Also in the off position of the sleeve 22, the roller 32 engages the reference surface 37, whereby the operating stem 28 is moved positively to open the broil switch 26. When the control dial 19 is rotated in the clockwise direction out of its off position into its variable bake position, the sleeve 22 is correspondingly rotated into its variable bake position so that the roller 31 disengages the slight depression 40 provided in the face of the projection 38 and is adapted to be moved into engagement with the reference surface 37 depending upon the action of the bellows 41 up the lever 44, as determined by the temperature of the oven 10. Accordingly, when the sleeve 22 occupies its bake position, the roller 31 disengaging the slight depression 40 in the projection 38 merely moves the operating stem 27, so that it may be said that the bake switch 25 is operated from its open position into its prepared position, as explained more fully below. Also, when the sleeve 22 occupies its bake position, the roller 31 either engages the reference surface 37 or the projection 38; and in either case, the operating stem 28 is moved so that the broil switch 26 is retained in its open position.

Also, as the control dial 19 is rotated in the clockwise direction out of its off position into its variable bake position, the threaded end 48 of the operating shaft 18 correspondingly adjusts the position of the traveling nut 49 away from the sleeve 22 so that the element 51 is urged further toward the left-hand end of the lever 44 creating a greater bias tending to rotate the lever 44 in the clockwise direction about its pivotal support 45 and tending to close the bake switch 25. Preferably the extreme inner end of the element 51 carries the resilient spring 52 that directly bears upon the left-hand end of the lever 44 so that a resilient bias is produced between the traveling nut 49 and the left-hand end of the lever 44. Now as the oven 10 is heated, the fluid in the bulb 42 is expanded causing expansion of the bellows 41 and a consequent bias upon the left-hand end of the lever 44 tending to rotate it in the counterclockwise direction about its pivotal support 45 and tending to open the bake switch 25. Thus, it will be understood that the bias that is exerted by the traveling nut 49 upon the left-hand end of the lever 44 tending to close the bake switch 25 is dependent upon the angle of rotation of the operating shaft 18 in the clockwise direction and consequently upon the angle of rotation of the control dial 19 in the clockwise direction out of its off position into its variable bake position. On the other hand, as the temperature of the oven 10 rises, the operating bellows 41 exerts a greater bias tending to rotate the lever 44 in the counterclockwise direction about its pivotal support 45 and tending to open the bake switch 25. Accordingly, it will be understood that the bias that is exerted by the traveling nut 49 is in opposition to the bias that is exerted by the operating bellows 41.

Now when the sleeve 22 is operated into its bake position, the bake switch 25 is operated into its prepared position, as previously noted, and whether the bake switch 25 is operated from its prepared position on into its closed position is dependent upon the composite bias exerted upon the left-hand end of the lever 44, as determined by the composite action of the traveling nut 49 and the operating bellows 41. First assuming that the oven 10 is at a temperature lower than the temperature set by the control dial 19, the bias established by the traveling nut 49 prevails over the bias established by the operating bellows 41; whereby the lever 44 is rotated in the clockwise direction about its pivotal support 45 operating the bake switch 25 from its prepared position into its closed position. Now as the temperature of the oven 10 rises, the bias produced by the operating bellows 41 upon the lever 44 is increased, and when the temperature of the oven 10 reaches that previously set by the control dial 19, the bias exerted by the operating bellows 41 prevails over that exerted by the traveling nut 49; whereby the bake switch 25 is operated from its closed position back into its prepared position. Thereafter when the temperature of the oven 10 is cooled below that set by the control dial 19, the bias established by the traveling nut 49 again prevails over that established by the operating bellows 41, whereby the lever 44 is again rotated in the clockwise direction about its pivotal support 45 again operating the bake switch 25 from its prepared position into its closed position. Thus, it will be appreciated that the thermal arrangement above described, including the operating bellows 41 controlled by the bulb 42, alternately operates the bake switch 25 between its closed and prepared positions in order to hold the temperature in the oven 10 to that previously set by the control dial 19. Moreover, it is apparent that the rotary position of the control dial 19 in its bake position effects a composite adjustment of the actions upon the lever 44 thereby to preset the temperature at which the oven 10 is held.

When the control dial 19 is rotated in the clockwise direction through its variable bake position into its broil position, the projection 38 first engages the roller 31 moving the operating stem 27 to effect opening of the bake switch 25; and then the roller 32 rides into the depression 39 so as to move the operating stem 28 to close the broil switch 26. Also, in the broil position of the sleeve 22, the stub 23 engages the opposite side of the stop 24 in order positively to prevent rotation of the sleeve 22 in the clockwise direction beyond its broil position; whereby it is necessary to return the sleeve 22 in the counterclockwise direction from its broil position through its bake position back into its off position.

Considering now in greater detail the connection and arrangement of the heating circuit, it is noted that a master switch 53 is arranged between the source of current supply and the switching mechanism 20 that includes two contact bridging members 54 and 55 and an operating solenoid 56. The solenoid 56 normally is deenergized, whereby the master switch 53 normally occupies its closed position so that the line conductors 14 and 15 are respectively connected to two feed conductors 57 and 58 extending into the switching mechanism 20. The terminals of the broil unit 11 are respectively connected to the left-hand contacts controlled by the bridging members 35 and 36 of the broil switch 26, and the feed conductors 57 and 58 are commonly connected to the right-hand contacts controlled by the bridging members 35 and 36 of the broil switch 26 and to the right-hand contacts controlled by the bridging members 33 and 34 of the bake switch 25. The bake units 12 and 13 are connected in parallel circuit relationship and the terminals thereof are rspectively connected to the left-hand contacts controlled by the bridging members 33 and 34 of the bake switch 25. Thus, it will be understood that when the master switch 53 occupies its closed position, the broil unit 11 may be selectively energized by the corresponding control of the broil switch 26 and the bake units 12 and 13 may be selectively energized by the corresponding control of the bake switch 25. Also, it will be understood that by virtue of the arrangement of the sleeve 22 cooperating with the rollers 31 and 32, the bake switch 25 and the broil switch 26 are positively interlocked so that these switches can not be simultaneously operated into their closed positions.

Recapitulating, the bake switch 25 is positively operated into its open position when the broil switch 26 is operated into its closed position; and the broil switch 26 is positively operated into its open position when the bake switch 25 is operated into its prepared position. Now the operation of the bake switch 25 between its prepared position and its closed position is dependent upon the conjoint actions of the traveling nut 49 and the operating bellows 41 and consequently upon the temperature set by the position of the control dial 19 in its variable bake position and upon the actual temperature of the oven 10, in the manner previously explained.

Figures 2, 3, 4, 5, 6, 7:
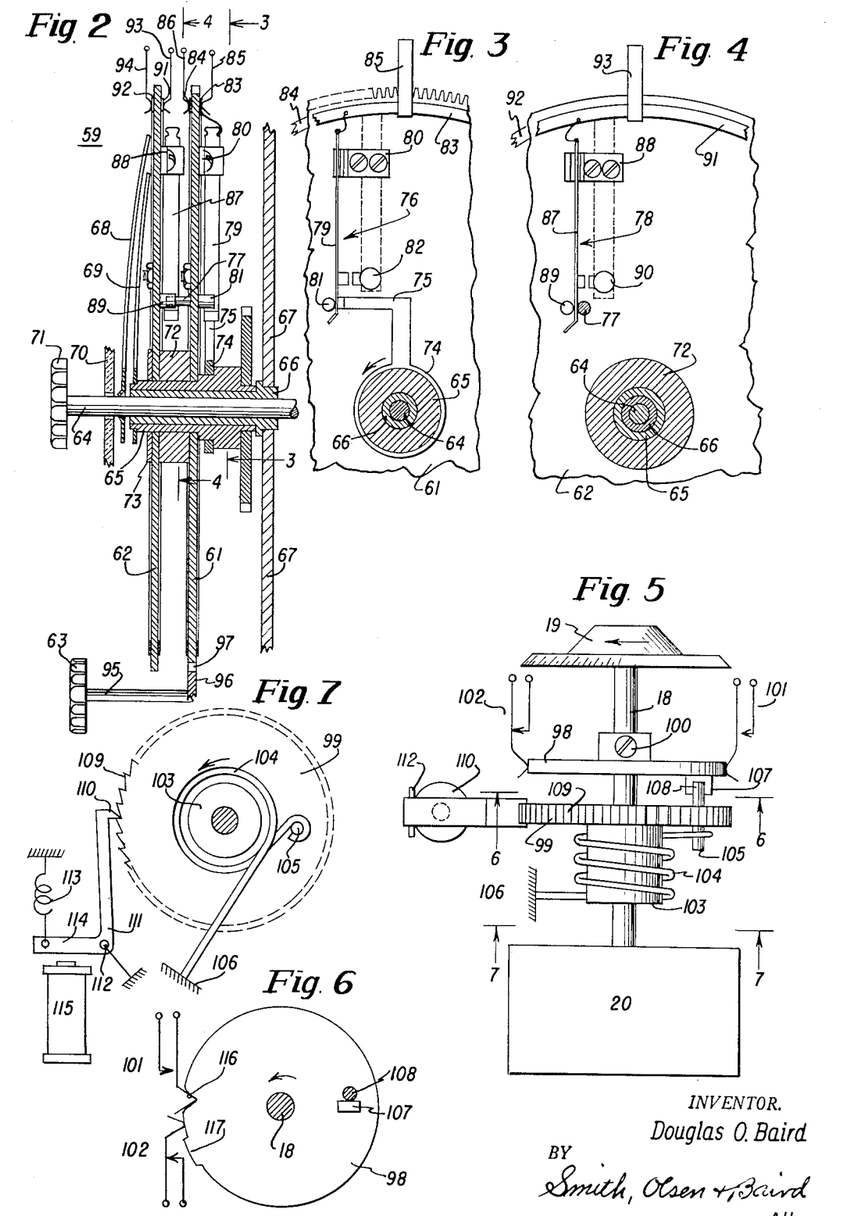
Fig. 2 is an enlarged fragmentary vertical sectional view of clock-controlled mechanism incorporated in the system of Fig. 1.
Fig. 3 is an enlarged fragmentary sectional view of a portion of the mechanism of Fig. 2, illustrating the drive for the start disk incorporated therein, this view being taken in the direction of the arrows along the line 3—3 in Fig. 2.
Fig. 4 is an enlarged fragmentary sectional view of another portion of the mechanism of Fig. 2, illustrating the drive for the stop disk incorporated therein, this view being taken in the direction of the arrows along the line 4—4 in Fig. 2.
Fig. 5 is an enlarged plan view of the control switch incorporated in the system of Fig. 1.
Fig. 6 is an enlarged sectional view of the switch of Fig. 5, illustrating the arrangement of the switching cam incorporated therein, this view being taken in the direction of the arrows along the line 6—6 in Fig. 5.
Fig. 7 is an enlarged sectional view of the switch of Fig. 5, illustrating the arrangement of the pawl and ratchet mechanism incorporated therein, this view being taken in the direction of the arrows along the line 7—7 in Fig. 5.

Further, the heating control circuit comprises clock mechanism 59 of the general construction and arrangement of that disclosed in the copending application of Douglas F. Illian and Norman T. Terp, Serial No. 314,674, filed October 14, 1952, now Patent 2,663,786. More particularly the clock mechanism 59 includes a synchronous timer motor 60 that is preferably of the "Telechron" type, a start disk 61, a stop disk 62, and a single manually operable control knob 63 that is employed for the purpose of selectively setting a start clock time upon the start disk 61 and a stop clock time upon the stop disk 62. The general construction and arrangement of the clock mechanism 59 is illustrated in Figs. 2 to 4, inclusive, and comprises a minute arbor 64 and an hour arbor 65 rotatably mounted respectively interiorly and exteriorly of a bearing sleeve 66 carried by a supporting plate 67. More particularly, the minute arbor 64 and the hour arbor 65 are rotated by the synchronous motor 60 through speed reduction gearing, not shown, the minute arbor 64 being rotated at one R. P. H. and carrying a minute hand 68, and the hour arbor 65 being rotated at $\frac{1}{12}$ R. P. H. and carrying an hour hand 69. The minute and hour hands 68 and 69 cooperate with a time-calibrated bezel, not shown, to provide a conventional clock arrangement, and are covered by a transparent crystal 70 having a central opening therein through which the minute arbor 64 projects. Also, the extreme outer end of the minute arbor 64 carries a time-setting knob 71 that is employed for the conventional purpose of appropriately setting the minute hand 68 and the hour hand 69. The start disk 61 and the stop disk 62 are formed of insulating material and loosely journalled upon the hour arbor 65 for rotation independently thereof and independently of each other and are retained in appropriate spaced-apart relation by an arrangement including an intervening collar 72 and a washer 73. Rigidly secured to a shoulder provided on the hour arbor 65 is an annular collar 74 that is provided with an operating arm 75 that cooperates with a start switch 76 carried by the start disk 61; and rigidly secured to the start disk 61 is a forwardly projecting pin 77 that cooperates with a stop switch 78 carried by the stop disk 62.

The start switch 76 includes a leaf spring 79 that is mounted at one end thereof upon a suitable bracket 80 carried by the start disk 61, which leaf spring 79 is backed-up adjacent to the free end by a stud 81 carried by the start disk 61. Also, a contact support 82 is carried by the start disk 61 and provided with a stationary contact that cooperates with an adjacent movable contact carried by the leaf spring 79 near the free end thereof. In the normal operation of the mechanism 59, the hour arbor 65 rotating in the clockwise direction drives the start disk 61 through the operating arm 75, the leaf spring 79 and the stud 81, whereby the start switch 76 is operated into its open position. Finally, the fixed end of the leaf spring 79 is connected to a commutator ring 83, and the contact support 82 is connected to a commutator ring 84, the contact rings 83 and 84 being disposed on opposite sides of the start disk 61 adjacent to the periphery thereof and being encircuited by cooperating brushes 85 and 86, respectively.

The stop switch 78 includes a leaf spring 87 that is mounted at one end thereof upon a suitable bracket 88 carried by the stop disk 62, which leaf spring 87 is backed-up adjacent to the free end thereof by a stud 89 carried by the stop disk 62. Also a contact support 90 is carried by the stop disk 62 and provided with a stationary contact that cooperates with an adjacent movable contact carried by the leaf spring 87 near the free end thereof. In the normal operation of the mechanism 59, the start disk 61 rotating in the clockwise direction drives the stop disk 62 through the pin 77, the leaf spring 87 and the stud 89, whereby the stop switch 78 is operated into its open position. Finally the fixed end of the leaf spring 87 is connected to a commutator ring 91 and the contact support 90 is connected to a commutator ring 92, the contact rings 91 and 92 being disposed on opposite sides of the stop disk 62 adjacent to the periphery thereof and being encircuited by cooperating brushes 93 and 94.

The manually operable control knob 63 is secured to the outer end of a rotatably mounted shaft 95 that carries a gear 96 on the inner end thereof, that, in turn, meshes with teeth 97 provided about the periphery of the start disk 61; which arrangement is employed for the purpose of setting the start disk 61 and the stop disk 62. As previously noted, during the normal operation of the mechanism 59, the hour arbor 65 rotating in the clockwise direction drives the start disk 61 and the stop disk 62 therewith, whereby the start switch 76 and the stop switch 78 are retained in their open position. Now in order to set respective start and stop clock times upon the mechanism 59, the manually operable knob 63 is manipulated. More particularly, to set a desired stop clock time the knob 63 is rotated in the counterclockwise direction so that the gear 96 rotates the start disk 61 through the teeth 97 in the clockwise direction ahead of the normal position thereof and ahead of the operating arms 75 carried by the hour arbor 65, the stop disk 62 being rotated with the start disk 61 in the clockwise direction ahead of the hour arbor 65. The knob 63 is then rotated in the clockwise direction so that the start disk 61 is rotated in the counterclockwise direction leaving the stop disk in its more advanced set stop position, the start disk 61 assuming a set start position intermediate the set stop position of the stop disk 62 and the actual time position of the hour arbor 65. When the start disk 61 is thus set into the start clock time, the arm 75 disengages the leaf spring 79, whereby the start switch 76 is operated into its closed position; and when the stop disk 62 is thus set into the stop clock time, the pin 77 disengages the leaf spring 87, whereby the stop switch 78 is operated into its closed position. Thus when the start and stop disks 61 and 62 are set into their respective start clock time and stop clock time positions, the respective start switch 76 and stop switch 78 are operated into their closed positions.

Subsequently when the hour arbor 65 is advanced into the set start clock time, the operating arm 75 again engages the leaf spring 79 moving it into engagement with the stop 81 thus operating the start switch 76 back into its normal open position and further driving the start disk 61 in its normal position with the hour arbor 65. Still subsequently, when the start disk 61 is advanced into the set stop clock time, the pin 77 again engages the leaf spring 87 moving it into engagement with the stop 89 thus operating the stop switch 78 back into its normal open position and further driving the stop disk 62 in its normal position with the start disk 61 and the hour arbor 65.

In passing, it is noted that the stop disk 62 carries a reference pointer, not shown, that cooperates with the time-calibrated bezel, not shown, of the clock mechanism 59 so that the set stop clock time bears a direct relationship to the actual clock time as established between the clock hands 68 and 69 and the bezel mentioned. Furthermore, the stop disk 62 has a slot, not shown, formed therein that cooperates with a scale, not shown, carried by the start disk 61 so that the set start clock time bears a direct relationship to the actual clock time as established between the clock hands 68 and 69 and the bezel mentioned. These arrangements and details have not been illustrated in the interest of brevity, since they form no part of the present invention and are completely disclosed in the previously-mentioned Illian and Terp application.

Further considering the construction and arrangement of the control switch 17 and referring to Figs. 5 to 7, inclusive, it is pointed out that the operating shaft 18 carries intermediate the control dial 19 and the switching mechanism 20, a switch control cam 98 and a ratchet wheel 99. The switch control cam 98 is rigidly secured to the operating shaft 18 by a set screw 100 and governs a cooperating bake switch 101 and a cooperating broil switch 102. The ratchet wheel 99 is loosely journalled upon the operating shaft 18 and is provided with an elongated hub 103 that is surrounded by a coil spring 104, one end of the coil spring 104 being secured to a pin 105 carried by the ratchet wheel 99 and the other end of the coil spring 104 being secured to an external support 106. Also, the switch control cam 98 carries an outwardly projecting tab 107 that cooperates with an outwardly projecting pin 108 carried by the adjacent side of the ratchet wheel 99. About the periphery of the ratchet wheel 99 there are provided teeth 109 that cooperate with a pawl 110 carried by a bell crank 111 that is pivotally mounted upon an external support, as indicated at 112. The bell crank 111 is normally biased in the clockwise direction about the pivot 112 by an arrangement including a coil spring 113 so that the pawl 110 normally engages the teeth 109 provided on the periphery of the ratchet wheel 99. The bell crank 111 is provided with an arm 114 that constitutes an armature operatively associated with an electromagnet 115 that is operative to attract the armature 114 against the bias of the coil spring 113 so as to withdraw the pawl 110 from the teeth 109 provided about the periphery of the ratchet wheel 99.

Considering further the operation of the control switch 17, it is pointed out that when the control dial 19 occupies its off position, the movable spring of the bake switch 101 rides into a notch 116 provided in the periphery of the switch control cam 98 operating the bake switch 101 into its open position; and when the control dial 19 occupies its bake position, the movable spring of the bake switch 101 rides out of the notch 116 operating the bake switch 101 into its closed position. Finally, when the control disk 98 is rotated into its broil position the movable spring of the broil switch 102 engages a projection 117 carried on the periphery of the switch control cam 98 operating the broil switch 102 into its open position. In passing, it is noted that the riding of the projection 117 under the movable spring of the bake switch 101 when the control dial 19 is rotated into its broil position is without a circuit control effect since the bake switch 101 already occupies its closed position.

In view of the foregoing additional description of the control switch 17, it will be understood that when the control dial 19 is rotated out of its off position in the clockwise direction, as viewed in Fig. 1, into its variable bake position, the switch control cam 98 is rotated therewith, whereby the tab 107 carried thereby engaging the pin 108 carried by the ratchet wheel 99 rotates the ratchet wheel 99 in the clockwise direction with the operating shaft 18 so that the coil spring 104 is wound up upon the hub 103. As the ratchet wheel 99 is thus rotated in the clockwise direction, as viewed in Fig. 1, the teeth 109 on the periphery thereof ride under the pawl 110 carried by the bell crank 111; whereby the pawl 110 latches the ratchet wheel 99 in its operated position. At this time, when the spring 104 is thus wound up, the control dial 19 may be returned manually from its variable bake position back in the counterclockwise direction, as viewed in Fig. 1, independently of the ratchet wheel 99 and without reference therewith. However, when the control dial 19 occupies its variable bake position, and the electromagnet 115 is energized, the armature 114 is attracted so that the bell crank 111 is operated to withdraw the pawl 110 from engagement with the teeth 109 on the periphery of the ratchet wheel 99 so that the coil spring 104 unwinds on the hub 103 returning the ratchet wheel 99 in the counterclockwise direction, as viewed in Fig. 1, back into its normal position. As the ratchet wheel 99 is thus rotated in the counterclockwise direction, as viewed in Fig. 1, the pin 108 engaging the tab 107 rotates the operating shaft 18 through the control switch cam 98 so that the control dial 19 is returned back into its off position.

In view of the foregoing, it will be understood that each time the control dial 19 is rotated in the clockwise direction, as viewed in Fig. 1, out of its off position into its variable bake position, the ratchet wheel 99 is rotated out of its normal position into its operated position storing energy in the coil spring 104; whereby the control dial 19 is conditioned to be returned in the counterclockwise direction from its variable bake position back into its off position when the ratchet wheel 99 is subsequently released as a consequence of the operation of the electromagnet 115. However, at any time the operator may return the control dial 19 from its variable bake position in the counterclockwise direction, as viewed in Fig. 1, back into its off position independently of the operated position of the ratchet wheel 99. It is noted that the angle of rotation of the ratchet wheel 99 from its normal position by rotation of the control dial 19 out of its off position is dependent upon the temperature that is set by the control dial 19 in its variable bake position; whereby there is always adequate energy stored in the coil spring 104 to return the control dial 19 back into its off position when it occupies any adjustment in its variable bake position. In passing, it is pointed out that when the control dial 19 is operated out of its off position through its variable bake position into its broil position, the ratchet wheel 99 is rotated therewith storing energy in the coil spring 104, but that this extreme operation of the rachet wheel 99 is of no control consequence as the coil spring 104 in its winding operation is capable of a full revolution of the ratchet wheel 99 without binding upon the hub 103.

Finally, the heating system comprises, as illustrated in Fig. 1, a start relay 118 provided with a pair of contacts 119, a stop relay 120 provided with two pairs of contacts 121 and 122, and a pickup relay 123 provided with two windings and two pairs of contacts 124 and 125. In the arrangement, one terminal of the synchronous motor 60 is connected to the line conductor 15 and the other terminal thereof is connected to the neutral conductor 16, as indicated by the conventional ground symbol. Also the line conductor 15 is connected to one of the springs of the bake switch 101, the other spring of the bake switch 101 being connected to one of the springs of the broil switch 102; and the other spring of the broil switch 102 is connected to a conductor 126. One terminal of the winding of the start relay 118 is connected to the conductor 126 and the other terminal thereof is connected to the leaf spring 79 of the start switch 76, the contact support 82 of the start switch 76 being connected to the neutral conductor 16. One terminal of the winding of the stop relay 120 is connected to the conductor 126 and the other terminal thereof is connected to the leaf spring 87 of the stop switch 78, the contact support 90 of the stop switch 78 being connected to the neutral conductor 16. One terminal of the winding of the solenoid 56 is connected to a conductor 127, and the other terminal thereof is connected to the neutral conductor 16, the conductor 127 being commonly connected to one terminal of the upper winding of the pickup relay 123 and to one of the contacts 119. The other terminal of the upper winding of the pickup relay 123 is connected to one of the contacts 121; and the other contact 119 is connected to the conductor 126; and the other contact 121 is connected to the neutral conductor 16. Also one of the contacts 122 is connected to the conductor 126, and the other contact 122 is connected to one of the contacts 125, the other contact 125 being connected to one terminal of the electromagnet 115; while the other terminal of the electromagnet 115 is connected to the neutral conductor 16. Finally, one terminal of the lower winding of the pickup relay 123 is connected to the neutral conductor 16 and the other terminal thereof is connected to one of the contacts 124, the other contact 124 being connected to the conductor 126.

Considering now the overall operation of the heating control circuit, it is pointed out that in order to carry out a manually controlled heating operation of the oven 10, it is only necessary selectively to operate the control switch 17, in the manner previously explained, leaving the clock mechanism 59 in its normal unset condition so that the master switch 53 remains in its closed position. In this case, the selective control of the heating circuits extending to the oven 10 is governed entirely by the positions of the bake switch 25 and the broil switch 26, as determined by the positions of the sleeve 22 of the control switch 17. In this manual operation of the control switch 17, the ratchet wheel 99 is operated out of its normal position storing energy in the coil spring 104; however without a control effect since the electromagnet 115 occupies its restored position and is not governed, in the present example.

Now in order to carry out an automatically controlled baking operation, it is only necessary selectively to operate the control switch 17 and selectively to set the clock mechanism 59; and it is immaterial whether the control switch 17 is selectively operated before or after setting of the clock mechanism 59, since the control circuits for the relays 118, 120 and 123 are dependent jointly upon operation of the control switch 17 and setting of the clock mechanism 59. More particularly, the control dial 19 is operated from its off position into its variable bake position in accordance with the temperature that is desired to be held in the oven 10, in the manner previously explained, whereby the bake switch 101 governed by the switch control cam 98 is closed; and of course, the switching mechanism 20 is operated to operate the bake switch 25 from its open position into its prepared position so that the bake switch 25 is further operated from its prepared position into its closed position, assuming that the oven 10 is cool at this time, in the manner previously explained. Now, the manually operable knob 63 of the clock mechanism 59 is manipulated so as to set a start clock time on the start disk 61 and to set a stop clock time on the stop disk 62; whereby the start switch 76 is closed and the stop switch 78 is closed. Closure of the start switch 76 completes a circuit for operating the start relay 118; whereby the latter relay completes, at its contacts 119, a circuit for energizing the solenoid 56 so as to effect operation thereof. Upon operating the solenoid 56 operates the master switch 53 into its open position so as to interrupt the circuit from the power source to the bake units 12 and 13 of the oven 10 at this time. Closure of the stop switch 78 completes a circuit for operating the stop relay 120, whereby the latter relay opens, at its contacts 122, a point in the circuit for operating the electromagnet 115. Also upon operating the start relay 118 and the stop relay 120 close their respective contacts 119 and 121, completing a circuit for energizing the upper winding of the pickup relay 123; whereby the latter relay operates to close its contacts 124, so as to complete a holding circuit for energizing the lower winding thereof. Also upon operating the pickup relay 123 closes its contacts 125 to prepare a point in the circuit for operating the electromagnet 115. At this time the heating circuit to the bake units 12 and 13 of the oven 10 is opened by the master switch 53 in its open position due to the energization of the solenoid 56; and both the start disk 61 and the stop disk 62 in the clock mechanism 59 are at rest, respectively retaining the start switch 76 and the stop switch 78 in their closed positions.

Now at the preset start clock time, further rotation of the start disk 61 is initiated effecting opening of the start switch 76, in the manner previously explained; whereby the start relay 118 restores to interrupt, at its contacts 119, the circuit for energizing in multiple the upper winding of the pickup relay 123 and the solenoid 56. The pickup relay 123 is retained in its operated position at this time by virtue of the completed holding circuit for energizing the lower winding thereof; however, the solenoid 56 is deenergized returning the master switch 53 into its closed position so that power is supplied to the bake units 12 and 13 effecting heating of the oven 10. Subsequently, at the preset stop clock time, further rotation of the stop disk 62 is initiated effecting opening of the stop switch 78, in the manner previously explained; whereby the stop relay 120 restores to complete, at its contacts 122, the previously-mentioned circuit for operating the electromagnet 115. This circuit extends from the line conductor 15 via the bake switch 101 in its closed position, the broil switch 102 in its closed position, the closed contacts 122 of the restored stop relay 120, the closed contacts 125 of the operated pickup relay 123 and the electromagnet 115 to the neutral conductor 16. Accordingly, the electromagnet 115 operates attracting its armature 114 so that the bell crank 111 effects the removal of the pawl 110 from the teeth 109 provided on the periphery of the ratchet wheel 99; whereby the coil spring 104 returns the control switch 17 in the counterclockwise direction from its variable bake position back into its off position. When the control dial 19 is thus returned back into its off position the switch control cam 98 operates the bake switch 101 into its open position deenergizing the electromagnet 115 and the lower winding of the pickup relay 123. The pickup relay 123 restores to interrupt, at its contacts 124, a further point in the holding circuit for energizing the lower winding thereof; and to interrupt, at its contacts 125, a further point in the circuit for operating the electromagnet 115. The electromagnet 115 restores to release its armature 114 so that the pawl 110 is returned into engagement with the teeth 109 provided on the ratchet wheel 99. At this time, the control switch 17 occupies its off position so that the bake switch 25 occupies its open position interrupting the heating circuit to the bake units 12 and 13 to arrest further heating of the oven 10. Also at this time the start disk 61 and the stop disk 62 rotate with the hour arbor 65 of the clock mechanism 59 respectively retaining the start switch 76 and the stop switch 78 in their open positions.

In view of the foregoing, it will be understood that after the control dial 19 is operated from its off position into its variable bake position appropriately to establish the temperature that it is desired to hold in the oven 10 and after the clock mechanism 59 is appropriately set to establish the start clock time and the stop clock time, the remainder of the operations are entirely automatic; whereby the heating circuit to the oven 10 is subsequently closed at the start clock time and is still subsequently opened at the stop clock time. Moreover at the conclusion of the automatic bake operation the control switch 17 occupies its off position and the clock mechanism 59 occupies its normal position so that no devices or knobs must be operated by the operator to restore the heating control circuit back to a manual control condition. In other words, at this time, reoperation of the control dial 19 from its off position into its variable bake position initiates a manually controlled bake operation without reference to the circumstance that there was an immediately preceding automatically controlled baking operation. Moreover, the arrangement wherein the stop clock time and the start clock time are completely wiped out of the clock mechanism 59 is very advantageous, since it is always necessary to set the clock mechanism 59 to a new and desired start clock time and stop clock time each time an automatically controlled baking operation is to be initiated. Furthermore in the heating control circuit, in order to carry out a manually controlled baking operation, it is only necessary to manipulate the control dial 19 to set the desired temperature; and in order to carry out an automatically controlled baking operation it is only necessary additionally to control the single manually operable control knob 63 for the purpose of setting into the clock mechanism 59 the start clock time and the stop clock time.

In passing, it is noted that when the control dial 19 is operated into its broil position, the broil switch 102 is operated into its open position so as positively to open the control circuits to the relays 118, 120 and 123 and the electromagnet 115 and the solenoid 56; which arrangement positively prevents any control by the clock mechanism 59 in carrying out a broiling operation in the oven 10; whereby the broiling operation in the oven 10 is always carried out entirely on a manually controlled basis.

In view of the foregoing, it is apparent that there has been provided an electric heating system for an oven, or the like, that is exceptionally useful in kitchen electric ranges and like cooking appliances, wherein a first manually operable control knob is provided for the purposes of electing baking and broiling operations to be carried out in the oven and of setting the desired baking temperature of the oven, and wherein a second manually operable control knob is provided for the purpose of selectively setting the start clock time and the stop clock time between which clock times it is desired to carry out an automatically controlled baking operation in the oven; whereby manipulation of only one or both of the two manually operable control knobs mentioned is required to carry out and to control completely any manual or automatic baking or broiling operation in the oven.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric heating system for an oven or the like comprising switching mechanism having an open position and a prepared position and a closed position, means for supplying heat to said oven in the closed position of said switching mechanism, a movable member having an off position and a variable on position, a movable element having a normal position and an operated position, a lost-motion connection between said member and said element, manually operable means for selectively moving said member in either direction between its off position and its variable on position both independently of the position of said element and at the will of the operator, a spring biasing said element into its normal position, said lost-motion connection being responsive to movement of said member from its off position into its variable on position to move said element against the bias of said spring from its normal position into its operated position, latch mechanism for restraining said element in its operated position, said spring moving said element from its operated position back into its normal position in response to the release of said latch mechanism, said lost-motion connection also being responsive to movement of said element from its operated position back into its normal position to move said member from its variable on position back into its off position, means responsive to movement of said member into its off position for operating said switching mechanism into its open position and responsive to movement of said member into its variable on position for operating said switching mechanism into its prepared position, adjustable thermal means responsive to the temperature of said oven for selectively operating said switching mechanism between its prepared position and its closed position, means selectively controlled by movement of said member in its variable on position for selectively adjusting said thermal means, and means including a control device for releasing said latch mechanism.

2. An electric heating system for an oven or the like comprising switching mechanism having an open position and a prepared position and a closed position, means for supplying heat to said oven in the closed position of said switching mechanism, a movable member having an off position and a variable on position, a movable element having a normal position and an operated position, a lost-motion connection between said member and said element, manually operable means for selectively moving said member in either direction between its off position and its variable on position both independently of the position of said element and at the will of the operator, a spring biasing said element into its normal position, said lost-motion connection being responsive to movement of said member from its off position into its variable on position to move said element against the bias of said spring from its normal position into its operated position, latch mechanism for restraining said element in its operated position, said spring moving said element from its operated position back into its normal position in response to the release of said latch mechanism, said lost-motion connection also being responsive to movement of said element from its operated position back into its normal position to move said member from its variable on position back into its off position, means responsive to movement of said member into its off position for operating said switching mechanism into its open position and responsive to movement of said member into its variable on position for operating said switching mechanism into its prepared position, adjustable thermal means responsive to the temperature of said oven for selectively operating said switching mechanism between its prepared position and its closed position, means selectively controlled by movement of said member in its variable on position for selectively adjusting said thermal means, clock mechanism, indicator mechanism controlled by said clock mechanism for releasing said latch mechanism at a set clock time, and manually operable means for selectively setting said indicator mechanism to any desired clock time.

3. An electric heating system for an oven or the like comprising a source of electric power, an electric heating unit operatively associated with said oven, switching mechanism connected to said heating unit and having an open position and a prepared position and a closed position, a master switch having a closed position connecting said source of power to said switching mechanism and an open position disconnecting said source of power from said switching mechanism, said master switch normally occupying its closed position, a movable member having an off position and a variable on position, manually operable means for selectively moving said member in either direction between its off position and its variable on position, means responsive to movement of said member into its off position for operating said switching mechanism into its open position and responsive to movement of said member into its variable on position for operating said switching mechanism into its prepared position, adjustable thermal means responsive to the temperature of said oven for selectively operating said switching mechanism between its prepared position and its closed position, means selectively controlled by movement of said member in its variable on position for selectively adjusting said thermal means, a motor operative to move said member from its variable on position back into its off position, clock mechanism selectively settable to establish a start clock time and a stop clock time, means responsive jointly to movement of said member into its variable on position and to setting of said clock mechanism for operating said master switch from its closed position into its open position, means controlled by said clock mechanism at said set start clock time for operating said master switch from its open position back into its closed position, and means controlled by said clock mechanism at said set stop clock time for operating said motor.

4. An electric heating system for an oven or the like comprising a source of electric power, an electric heating unit operatively associated with said oven, switching mechanism connected to said heating unit and having an open position and a prepared position and a closed position, a master switch having a closed position connecting said source of power to said switching mechanism and an open position disconnecting said source of power from said switching mechanism, said master switch normally occupying its closed position, a movable member having an off position and a variable on position, manually operable means for selectively moving said member in either direction between its off position and its variable on position, means responsive to movement of said member into its off position for operating said switching mechanism into its open position and responsive to movement of said member into its variable on position for operating said switching mechanism into its prepared position, adjustable thermal means responsive to the temperature of said oven for selectively operating said switching mechanism between its prepared position and its closed position, means selectively controlled by movement of said member in its variable on position for selectively adjusting said thermal means, a motor operative to move said member from its variable on position back into its off position, means responsive to movement of said member from its off position into its variable on position for conditioning said motor, clock mechanism selectively settable to establish a start clock time and a stop clock time, means responsive jointly to movement of said member into its variable on position and to setting of said clock mechanism for operating said master switch from its closed position into its open position, means controlled by said clock mechanism at said set start clock time for operating said master switch from its open position back into its closed position, and means controlled by said clock mechanism at said set stop clock time for operating said conditioned motor.

5. An electric heating system for an oven or the like comprising a source of electric power, an electric heating unit operatively associated with said oven, switching mechanism connected to said heating unit and having an open position and a prepared position and a closed position, a master switch having a closed position connecting said source of power to said switching mechanism and an open position disconnecting said source of power from said switching mechanism, said master switch normally occupying its closed position, a movable member having an off position and a variable on position, a movable element having a normal position and an operated position, a lost-motion connection between said member and said element, manually operable means for selectively moving said member in either direction between its off position and its variable on position both independently of the position of said element and at the will of the operator, a spring biasing said element into its normal position, said lost-motion connection being responsive to movement of said member from its off position into its variable on position to move said element against the bias of said spring from its normal position into its operated position, latch mechanism for restraining said element in its operated position, said spring moving said element from its operated position back into its normal position in response to the release of said latch mechanism, said lost-motion connection also being responsive to movement of said element from its operated position back into its normal position to move said member from its variable on position back into its off position, means responsive to movement of said member into its off position for operating said switching mechanism into its open position and responsive to movement of said member into its variable on position for operating said switching mechanism into its prepared position, adjustable thermal means responsive to the temperature of said oven for selectively operating said switching mechanism between its prepared position and its closed position, means selectively controlled by movement of said member in its variable on position for selectively adjusting said thermal means, clock mechanism selectively settable to establish a start clock time and a stop clock time, means responsive jointly to movement of said member into its variable on position and to setting of said clock mechanism for operating said master switch from its closed position into its open position, means controlled by said clock mechanism at said set start clock time for operating said master switch from its open position back into its closed position, and means controlled by said clock mechanism at said set stop clock time for releasing said latch mechanism.

6. An electric heating system for an oven or the like comprising a source of electric power, an electric heating unit operatively associated with said oven, switching mechanism connected to said heating unit and having an open position and a prepared position and a closed position, a normally closed switch connecting said source of power to said switching mechanism, a member having an off position and a variable on position, manually operable means for selectively moving said member between its off position and its variable on position, means responsive to movement of said member into its off position for operating said switching mechanism into its open position and responsive to movement of said member into its variable on position for operating said switching mechanism into its prepared position, adjustable thermal means responsive to the temperature of said oven for selectively operating said switching mechanism between its prepared position and its closed position, means selectively controlled by movement of said member in its variable on position for selectively adjusting said thermal means, a motor operative to move said member from its variable on position back into its off position, clock mechanism, first indicator mechanism controlled by said clock mechanism and having a normal position and a variable set position, second indicator mechanism controlled by said clock mechanism and having a normal position and a variable set position, manually operable means for selectively moving said first indicator mechanism from its normal position into its set position corresponding to any desired start clock time and for selectively moving said second indicator mechanism from its normal position into its set position corresponding to any desired stop clock time, means including said clock mechanism for returning said first indicator mechanism from its set position back into its normal position at said set start clock time and for returning said second indicator mechanism from its set position back into its normal position at said set stop clock time, means responsive jointly to movement of said member into its variable on position and to movement of said first indicator mechanism out of its normal position for opening said switch, first control means responsive to movement of said first indicator mechanism back into its normal position for reclosing said switch, and second control means responsive to movement of said second indicator mechanism back into its normal position for operating said motor.

7. The electric heating system set forth in claim 6, wherein said first control means includes first switching contacts operated by said first indicator mechanism in its normal position, and said second control means includes second switching contacts operated by said second indicator mechanism in its normal position.

8. In an electric heating system including an oven provided with a bake unit and a broil unit, a source of electric power, a bake switch having an open position and a prepared position and a closed position, and a broil switch having an open position and a closed position, said bake unit being energized from said source when said bake switch occupies its closed position and said broil unit being energized from said source when said broil switch occupies its closed position; the combination comprising a movable member having an off position and a variable bake position and a broil position, the variable bake position of said member being disposed between the off and the broil positions thereof, manually operable means for selectively moving said member in either direction between its various positions, means responsive to movement of said member into its off position for operating both said bake switch and said broil switch into their open positions and responsive to movement of said member into its variable bake position for operating said bake switch into its prepared position and for operating said broil switch into its open position and responsive to movement of said member into its broil position for operating said bake switch into its open position and for operating said broil switch into its closed position, adjustable thermal means responsive to the temperature of said oven for selectively operating said bake switch between its prepared position and its closed position, means selectively controlled by movement of said member in its variable bake position for selectively adjusting said thermal means, a motor operative to move said member from its variable bake position back into its off position, means responsive to movement of said member into its variable bake position for conditioning said motor and responsive to movement of said member into its off and broil positions for disabling said motor, and means including a control device for operating said conditioned motor.

9. In an electric heating system including an oven provided with a bake unit and a broil unit, a source of electric power, a bake switch having an open position and a prepared position and a closed position, and a broil switch having an open position and a closed position, said bake unit being energized from said source when said bake switch occupies its closed position and said broil unit being energized from said source when said broil switch occupies its closed position; the combination comprising a movable member having an off position and a variable bake position and a broil position, a movable element having a normal position and an operated position, a lost-motion connection between said member and said element, manually operable means for selectively moving said member in either direction between its various positions both independently of the position of said element and at the will of the operator, a spring biasing said element into its normal position, said lost-motion connection being responsive to movement of said member from its off position into its variable bake position to move said element against the bias of said spring from its normal position into its operated position, latch mechanism for restraining said element in its operated position, said spring moving said element from its operated position back into its normal position in response to the release of said latch mechanism, said lost-motion connection also being responsive to movement of said element from its operated position back into its normal position to move said member from its variable bake position back into its off position, means responsive to movement of said member into its off position for operating both said bake switch and said broil switch into their open positions and responsive to movement of said member into its variable bake position for operating said bake switch into its prepared position and for operating said broil switch into its open position and responsive to movement of said member into its broil position for operating said bake switch into its open position and for operating said broil switch into its closed position, adjustable thermal means responsive to the temperature of said oven for selectively operating said bake switch between its prepared position and its closed position, means selectively controlled by movement of said member in its variable bake position for selectively adjusting said thermal means, and means including a control device for releasing said latch mechanism.

10. An electric heating system for an oven or the like comprising switching mechanism having an open position and a prepared position and a closed position, means for supplying heat to said oven in the closed position of said switching mechanism, a rotatably mounted member having an off position and a variable on position, a rotatably mounted ratchet wheel having a normal position and an operated position, a lost-motion connection between said member and said ratchet wheel, manually operable means for selectively rotating said member in either direction between its off position and its variable on position both independently of the position of said ratchet wheel and at the will of the operator, a spring biasing said ratchet wheel into its normal position, said lost-motion connection being responsive to rotation of said member from its off position into its variable on position to rotate said ratchet wheel against the bias of said spring from its normal position into its operated position, a pawl normally restraining said ratchet wheel in its operated position, said spring rotating said ratchet wheel from its operated position back into its normal position in response to operation of said pawl to release said ratchet wheel, said lost-motion connection also being responsive to rotation of said ratchet wheel from its operated position back into its normal position to rotate said member from its variable on position back into its off position, means responsive to rotation of said member into its off position for operating said switching mechanism into its open position and responsive to rotation of said member into its variable on position for operating said switching mechanism into its prepared position, adjustable thermal means responsive to the temperature of said oven for selectively operating said switching mechanism between its prepared position and its closed position, means selectively controlled by rotation of said member in its variable on position for selectively adjusting said thermal means, and means including a control device for operating said pawl.

11. An electric heating system for an oven or the like comprising switching mechanism having an open position and a prepared position and a closed position, means for supplying heat to said oven in the closed position of said switching mechanism, a rotatably mounted member having an off position and a variable on position, a rotatably mounted ratchet wheel having a normal position and an operated position, a lost-motion connection between said member and said ratchet wheel, manually operable means for selectively rotating said member in either direction between its off position and its variable on position both independently of the position of said ratchet wheel and at the will of the operator, a spring biasing said ratchet wheel into its normal position, said lost-motion connection being responsive to rotation of said member from its off position into its variable on position to rotate said ratchet wheel against the bias of said spring from its normal position into its operated position, a pawl normally restraining said ratchet wheel in its operated position, said spring rotating said ratchet wheel from its operated position back into its normal position in response to operation of said pawl to release said ratchet wheel, said lost-motion connection also being responsive to rotation of said ratchet wheel from its operated position back into its normal position to rotate said member from its variable on position back into its off position, means responsive to rotation of said member into its off position for operating said switching mechanism into its open position and responsive to rotation of said member into its variable on position for operating said switching mechanism into its prepared position, adjustable thermal means responsive to the temperature of said oven for selectively operating said switching mechanism between its prepared position and its closed position, means selectively controlled by rotation of said member in its variable on position for selectively adjusting said thermal means, an electromagnet operative to operate said pawl, a circuit for operating said electromagnet, and a control device for governing said circuit.

References Cited in the file of this patent

UNITED STATES PATENTS

| Number | Name | Date |
|---|---|---|
| 1,758,619 | Phillips | May 13, 1930 |
| 2,200,110 | Andersen | May 7, 1940 |
| 2,313,065 | Halloran | Mar. 9, 1943 |
| 2,416,084 | Candor | Feb. 18, 1947 |
| 2,606,991 | Candor | Aug. 12, 1952 |
| 2,638,979 | Harris | May 19, 1953 |
| 2,663,786 | Illian et al. | Dec. 22, 1953 |